Feb. 20, 1951 R. O. WHITESELL 2,542,852
CONSTANT VOLTAGE POWER SUPPLY
Filed Oct. 14, 1944 2 Sheets-Sheet 1

INVENTOR.
Robert O. Whitesell
BY Chester F. Carlson
ATTORNEY

Feb. 20, 1951     R. O. WHITESELL     2,542,852
CONSTANT VOLTAGE POWER SUPPLY
Filed Oct. 14, 1944     2 Sheets—Sheet 2
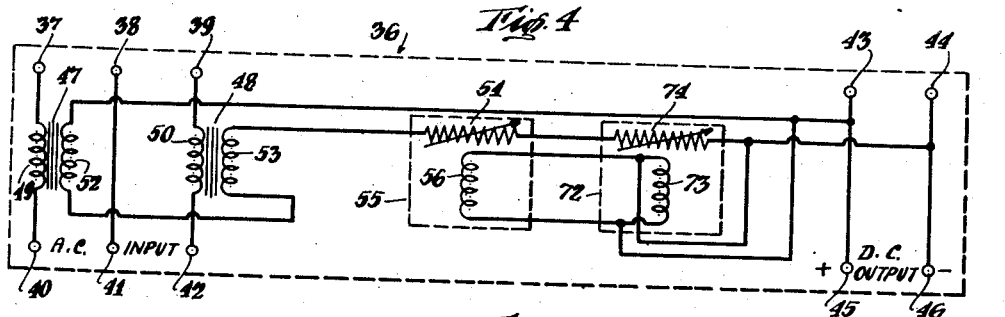
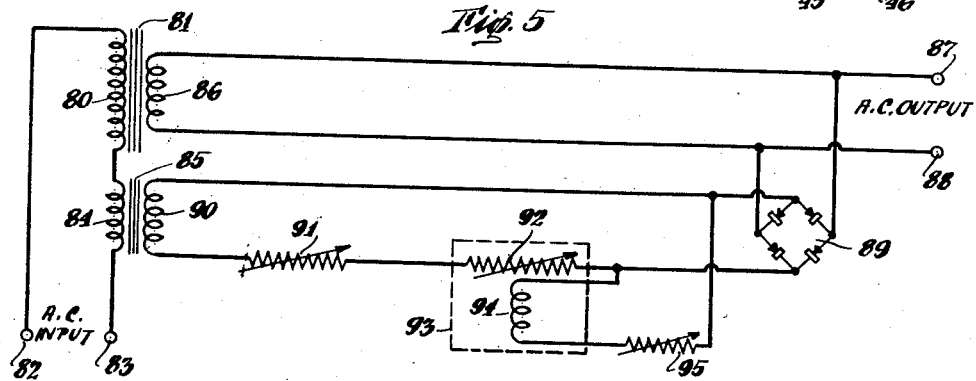
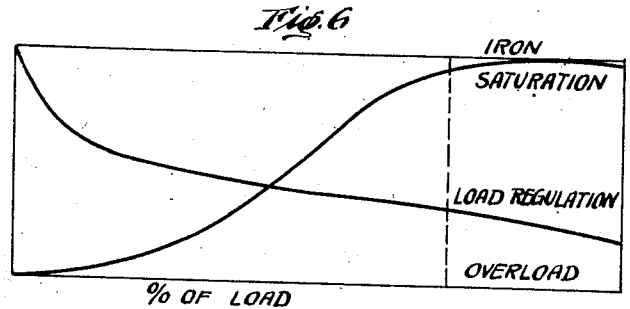
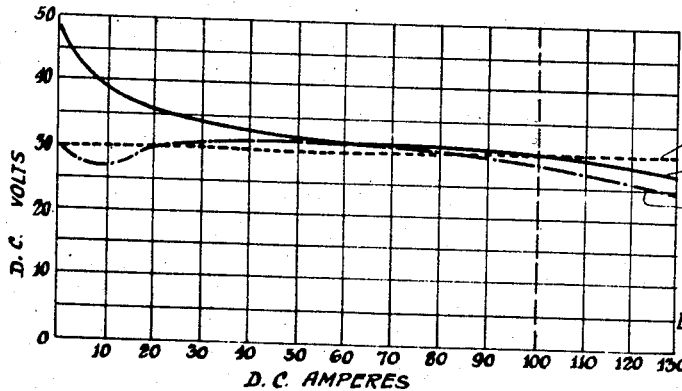
INVENTOR.
Robert O. Whitesell
BY Chester F. Carlson
ATTORNEY Patented Feb. 20, 1951

2,542,852

UNITED STATES PATENT OFFICE 2,542,852

CONSTANT VOLTAGE POWER SUPPLY

Robert O. Whitesell, Indianapolis, Ind., assignor to P. R. Mallory & Co., Inc., Indianapolis, Ind., a corporation of Delaware Application October 14, 1944, Serial No. 558,693

8 Claims. (Cl. 321—25)

The present invention relates to power supply systems, and, more particularly, to constant voltage power supply systems of novel and improved character.

As those skilled in the art know, in circuits involving the use of tubes, dry disc rectifiers, electrolytic rectifiers, and the like, it is frequently desirable to control the direct current output voltage by producing variations in the alternating current input circuit. Heretofore, principally saturated reactors have been used for this purpose, which by proper design may be made to operate over a predetermined portion of the saturation curve to produce the desired reactive voltage drops for predetermined currents flowing through the reactance coils. Power supply systems of the described character, however, had various important disadvantages. Thus, such conventional systems were strictly current sensitive, as the control was provided by the change of alternating current flow through the reactors. Consequently, such systems were unable to compensate for output voltage changes due to variations in the A. C. input voltage. This was a source of serious operating difficulties because the A. C. line voltage changes were directly transmitted to corresponding changes in the D. C. output voltage. Also, the control provided by such prior systems was at its best rather rough and imperfect and the range of regulation coverage was greatly restricted. Although various suggestions and proposals were made to eliminate the foregoing difficulties experienced with reactor-regulated constant voltage power supply systems, none, as far as is known, of these suggestions and proposals was completely satisfactory and successful when carried out on a practical and industrial scale.

It is an object of the present invention to provide a simple and completely satisfactory solution for the outstanding problem.

It is another object of the present invention to provide a constant voltage power supply system capable of delivering constant and adjustable direct or alternating voltages regardless of variations of the input voltage and of the output load.

It is another object of the present invention to provide a constant voltage rectifier power supply system of improved character for supplying rectified direct current voltage of constant and adjustable value from an alternating voltage power line, such output voltage being automatically maintained within close limits even though both the line voltage and the output current may be subject to considerable variations.

It is also within the contemplation of the invention to provide a reactor-controlled power supply system in which the effective reactance of the reactor element is a function of both the output current and of the rectified output voltage whereby a heretofore unobtainable accuracy of voltage control is realized.

The invention also contemplates a reactor-controlled power supply system for delivering constant A. C. or D. C. voltages from an A. C. source of generally variable voltage, which is very simple in construction, satisfactory and foolproof in operation, is capable of handling very substantial power output, and which may be readily manufactured on a practical and commercial scale at a low cost.

Other and further objects and advantages of the invention will become apparent from the following description, taken in conjunction with the accompanying drawings; in which Fig. 1 illustrates a rectifier power supply system together with a preferred form of circuit organization of the control device embodying the invention;

Fig. 4 is the circuit diagram of a further modified embodiment of the invention into a rectifier power supply system;

Fig. 5 is a similar circuit diagram of a constant voltage alternating current power supply system embodying the invention; and Figs. 6 and 7 represent various regulation curves of rectifier power supply systems embodying the invention.

While a preferred embodiment of the invention is described herein, it is contemplated that considerable variation may be made in the method of procedure and the construction of parts without departing from the spirit of the invention. In the following description and in the claims, parts will be identified by specific names for convenience, but they are intended to be as generic in their application to similar parts as the art will permit.

Broadly stated, in accordance with the principles of the present invention, a reactor or reactors are provided, having at least a pair of windings on the same iron core. One of said windings is connected in series with the A. C. input to the rectifier, while the other is connected with the D. C. output from the rectifier. With no load connected to the rectifier, the only A. C.

current drawn by the transformer is its exciting load. Under this condition the reactive drop through the reactor is great, thus holding the open circuit D. C. voltage at a minimum. Now by applying a D. C. load to the rectifier and gradually decreasing the load resistance, the A. C. current through the reactor will increase and the D. C. current through the corresponding winding of the reactor will also increase. These factors will tend to increase the flux density of the iron circuit of the reactor and will decrease the reactance drop. As the flux density of the iron in the reactor increase with D. C. load, and the D. C. voltage output normally decreases with the increasing D. C. load, by proper circuit design it is possible to obtain almost perfect compensation and thus good regulation except when line voltage variations occur.

In applications where it is desired to also provide regulation for line voltage changes, it is preferred to insert a veriable resistance of a voltage-sensitive regulator of the carbon pile or similar type in series with the D. C. saturating circuit of the reactor or reactors, and to control this series resistance automatically by placing the voltage-sensitive coil of the regulator across the D. C. voltage output. This regulator can be adjusted to dissipate a very low wattage when operating conditions are normal, and will control the D. C. saturation current when line voltage changes occur, or when the reactor is unable to regulate the output voltage fully over certain portions of the load curve. As line voltage taps may be provided to adjust for high, normal, and low line voltages, the voltage regulator can handle large capacity circuits with a low wattage dissipation. In applications of lower capacity, the regulator may be of sufficient capacity to handle all line voltage variations encountered and thus obviate the necessity of line voltage tap switches.

Figure 1:
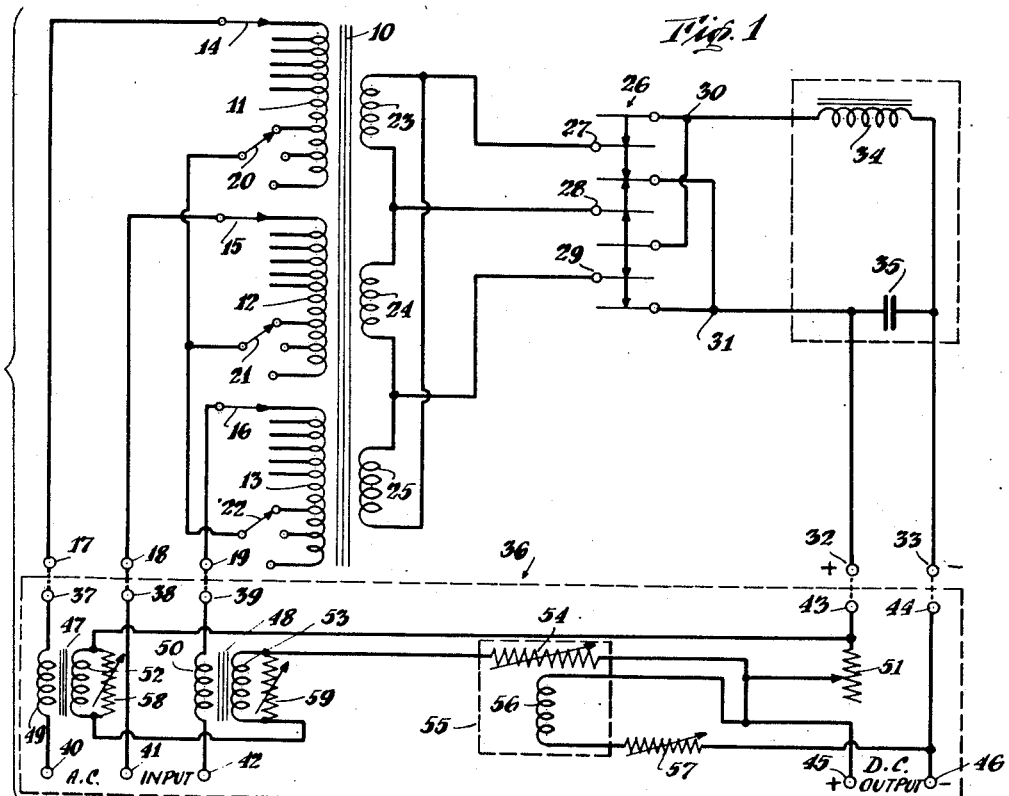

Referring now more particularly to Fig. 1 of the drawing, reference character 10 denotes a three-phase transformer having three primary windings 11, 12 and 13. One end of the said primary windings is tapped, such taps being selectively connected by means of tap switches 14, 15 and 16, respectively, to terminals 17, 18 and 19, respectively. The other ends of the primary windings are likewise tapped, such taps being selectively connected together by means of tap switches 20, 21 and 22, respectively. Secondary windings 23, 24 and 25 of the transformer are operatively associated with a three-phase bridge rectifier 26 having input terminals 27, 28 and 29 and output terminals 30 and 31. The rectified output is withdrawn at terminals 32 and 33 of which 32 is directly connected to terminal 31 of the rectifier bridge and 33 is connected to terminal 30 of the rectifier bridge through a filter choke 34. A filter condenser 35 is connected across output terminals 32 and 33.

The constant voltage control circuit is generally denoted by reference character 36 and is provided with three A. C. output terminals 37, 38 and 39, respectively connected to terminals 17, 18 and 19 of the power pack and with three A. C. input terminals 40, 41 and 42, which may be connected to the three-phase A. C. power line. D. C. input terminals 43 and 44 of the control circuit are respectively connected to D. C. terminals 32 and 33 of the power pack and D. C. output terminals 45 and 46 are provided for connecting the output load.

Voltage control is effected by means of two reactors 47 and 48, each having two windings on a common iron core. Winding 49 of reactor 47 is connected between terminals 37 and 40, winding 50 of reactor 48 is connected between terminals 39 and 42, and terminals 38 and 41 are directly connected with each other. Terminals 43 and 45 have an adjustable bleeder resistance 51 connected therebetween, while terminals 44 and 46 are directly connected together. The other windings of the two reactors, 52 and 53, are connected in series with each other and with variable control resistance 54 and together across resistance 51. Variable resistance 54 forms part of a voltage-sensitive regulator 55 of the carbon pile or similar type having a voltage-responsive operating coil 56, connected through an adjustable resistance 57 across output terminals 45 and 46. An adjustable resistance 58 and 59 is respectively connected across windings 52 and 53 of the two reactors.

From the foregoing description, the operation of the constant voltage power supply system of the invention will be readily understood by those skilled in the art. The circuit organization of the power pack itself is of conventional character and will not require any detailed description, it being sufficient to state that when three-phase A. C. is applied to terminals 17, 18 and 19 thereof, a rectified and filtered D. C. output may be withdrawn between its output terminals 32 and 33. Voltage regulator 55 is likewise of conventional construction in which the value of resistance 54 will be increased with increasing voltage between D. C. output terminals 45 and 46, causing increased current flow through its operating coil 56.

When there is no load connected to D. C. output terminals 45 and 46, the only A. C. current drawn by the transformer 10 is its exciting load, since the load of operating coil 56 on the output circuit is negligible. Reactors 47, 48 being far from the saturation point, the reactive drop therethrough is great, and consequently the open circuit D. C. voltage is very low. When a D. C. load is connected between output terminals 45 and 46, and this load is increased, there will be produced an increasing voltage drop in resistance 51. D. C. windings 52 and 53 of the reactors will be energized by this voltage drop through variable resistance 54 of voltage regulator 55 and will correspondingly increase the flux density in the iron circuits of the reactors, thereby decreasing their reactance. This, of course, will apply increased A. C. voltage to terminals 17, 18 and 19 of the transformer. Thus, the A. C. input voltage will be automatically adjusted in accordance with the D. C. output current. Operating coil 56 of automatic voltage regulator 55 is connected through adjustable resistance 57 to D. C. output terminals 45 and 46. When the output voltage increases for any reason, for example due to increase in the line input voltage, resistance 54 will be increased thereby reducing the D. C. current flow through coils 52 and 53 of the reactors. Therefore, the reactance of the said reactors will be increased, cutting down the voltage applied to the transformer by a corresponding amount. In other words, the D. C. output voltage will be maintained constant, regardless of variations in the A. C. line voltage and in the D. C. output load. The provision of adjustable resistances 58 and 59 across the D. C. windings of the reactors has the object of adjusting the proper operating point of the reactors and also to compensate for slight differences in the characteristics thereof. The current-responsive characteristics of the control circuit may be adjusted by means of adjustable resistance 51 and its voltage-responsive characteristics by means of adjustable resistance 57 in a manner well understood. If desired, three reactors may be employed, one for each of the primary windings of the three-phase transformer whereby improved regulation and circuit balance are obtained.

Figure 2:
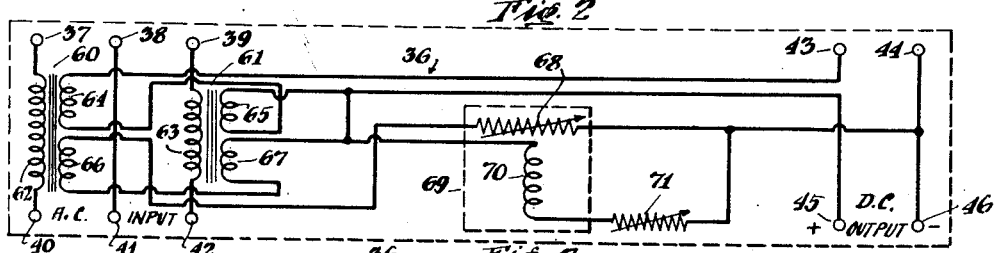
Fig. 2 depicts the circuit diagram of a modified control device embodying the principles of the present invention.

Fig. 2 illustrates a modified control circuit which may be connected in the same way to the power pack shown in Fig. 1. Similar reference characters have been used to denote the corresponding terminals in this circuit. The circuit likewise comprises two reactors 60 and 61, each having one A. C. winding and two D. C. windings. Winding 62 of reactor 60 is connected between terminals 37 and 40, winding 63 of reactor 61 is connected between terminals 39 and 42, and terminals 38 and 41 are directly connected with each other. Windings 64 and 65 of reactors 60 and 61, respectively, are connected in series with each other and in series with the D. C. load, between terminals 43 and 45. Thus, the current flowing through these windings will be identical with the load current. Windings 66 and 67 of reactors 60 and 61, respectively, are connected in series with each other and with variable control resistance 68 of automatic voltage regulator 69, and across output terminals 45 and 46. The value of resistance 68 is controlled by voltage-responsive operating coil 70, connected through adjustable resistance 71 across output terminals 45 and 46.

The operation of this modified embodiment of the invention will be easily understood if it is considered that an increase in the load current will increase the current flow through windings 64 and 65 of the two reactors. This will reduce their reactance so that a higher A. C. voltage will be applied to the transformer. On the other hand, an increase in output voltage between D. C. output terminals 45 and 46 will increase the current flowing through operating coil 70 of regulator 69 and will increase the value of control resistance 68. Thus, the current flowing through windings 66 and 67 of the reactors will be decreased, thereby increasing their reactance, and decreasing the A. C. voltage applied to the transformer. Obviously, by proper design of the reactors and of the other circuit constants, the output voltage may be maintained constant under all operating conditions. Resistance 71 serves to adjust the operating range of regulator 69 and thus the output voltage to the desired value.

Figure 3:
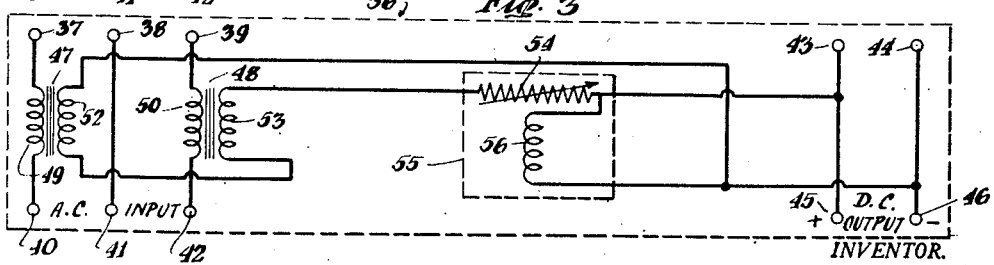
Fig. 3 shows another modified embodiment of the invention into a rectifier power supply system.

The embodiment of the invention shown in Fig. 3 is in most respects similar to the one described in connection with Fig. 1 and similar reference characters have been employed to denote corresponding parts. The difference resides in that the D. C. windings 52 and 53 of reactors 47 and 48, respectively, with variable resistance 54 of voltage-sensitive regulator 55 are directly connected across the D. C. output terminals 45 and 46, rather than across the bleeder resistance 51 of Fig. 1. Thus, when the D. C. output voltage between the said terminals increases, the operating current of regulator 56 will be also increased, thereby increasing the value of resistance 54. This in turn will reduce the flow of D. C. current through windings 52 and 53 of the reactors so that their reactance is increased and will reduce the A. C. voltage applied to transformer 10 by an appropriate amount so that the predetermined D. C. output voltage will be restored. The same remarks apply to the circuit of Fig. 4 in which merely another voltage-sensitive regulator 72 has been added, with its operating coil 73 connected across operating coil 56 of the first regulator and with its variable resistance 74 connected in series with the corresponding resistance 54 of the first regulator. There is no qualitative difference between the operation of the circuits of Figs. 3 and 4, except that the latter is capable of covering a wider operating range in view of the provision of two voltage-responsive regulators.

Fig. 5 illustrates a typical circuit for applying the principles of the invention to a constant voltage A. C. power supply system. Primary winding 80 of a transformer 81 is connected to A. C. input terminals 82 and 83 through winding 84 of a reactor 85. Secondary winding 86 is connected to A. C. output terminals 87 and 88. Part of the A. C. output is rectified by means of a bridge rectifier 89, and the rectified output is connected to D. C. winding 90 of the reactor through an adjustable resistance 91 and a variable resistance 92. Resistance 92 is forming part of voltage responsive regulator 93, the operating coil 94 of which is likewise connected to the output of the bridge rectifier through an adjustable resistance 95. An increase in the A. C. output voltage between terminals 87 and 88 increases the rectifier output voltage, which causes the regulator 93 to change the reactor drop and thus provides automatic compensation. Of course, this operating principle may be applied to three-phase or other transformers with obvious modifications. The A. C. output voltage may be adjusted by means of resistances 91 and 95.

Fig. 6 illustrates the variation of flux density in the iron circuit of the reactor and that of the D. C. output voltage with the load. It will be readily seen that the flux density of the iron in the reactor increases with D. C. load. The symmetrical shape of the two curves makes it possible, by proper circuit design, to obtain almost perfect compensation and thus good regulation, except when line voltage variations occur. Of course, the variations in line voltage may be taken care of by any one of the various arrangements disclosed in the foregoing.

It will be noted that the principles of the invention provide various important advantages. Thus, the circuits of the invention make it possible to provide a reliable and fully automatic rectifier power supply system capable of handling very substantial amounts of power up to about 20 kw. direct current output and over, and of maintaining the voltage constant and adjustable within close limits regardless of local variations within the rating of the device and of line voltage variations of predetermined value. The potential capacity is only limited by the limited capacity of commercial voltage regulators, which is at present restricted to about 100 watts but may be further extended by employing a plurality of such regulators. As indicated in the foregoing, line voltage taps may be provided to adjust the transformer for high, normal and low line voltages, so that the voltage regulator can handle large capacity circuits with a low wattage dissipation. In applications of lower capacity, the regulator may be sufficient to handle all line voltage variations encountered and thus obviate the necessity of the line voltage tap switches. By inserting a resistance in series with the regulator coil load, such as resistance 57 in Fig. 1, the output voltage under control may be varied over a considerable range, for example from 24 to 30 volts, in a circuit normally designed to operate at 28 volts. Taps may be also provided on the power transformer for this purpose so that the regulator will not have to control the complete voltage range.

It is also to be observed that the principles of the invention provide excellent voltage regulation under varying conditions of load and of line voltage. As it will appear from curve A of Fig. 7, in a 100 amp.-28 volt power unit the output voltage may be maintained substantially constant when the load is increased from a very small value up to about 130 amperes, such constant output voltage being maintained even though the A. C. input voltage may be varying within plus or minus 10%. Curve B shows the very inferior regulation of a conventional power supply system in which the output voltage may vary as much as 50% between no load and full load conditions even though the A. C. input voltage remains constant. Curve C indicates the greatly improved regulation obtainable by using reactors alone, although this type of operation is satisfactory only where the A. C. input voltage is not subject to substantial variations.

Moreover, the power supply systems of the invention are very simple in construction and may be readily manufactured on a quantity production scale at a low cost.

While the present invention, as to its objects and advantages, has been described herein as carried out in specific embodiments thereof, it is not desired to be limited thereby but it is intended to cover the invention broadly within the spirit and scope of the appended claims.

What is claimed is:

1. A constant voltage rectifier power supply system comprising in combination an A. C. input circuit including the primary winding of a transformer, a D. C. output circuit including the secondary winding of said transformer and a rectifier, a reactor having a winding connected in said input circuit and having a second winding, means responsive to the output current to apply D. C. voltage to said second winding proportionally to said current, means responsive to the output voltage to vary the resistance in the circuit of said second winding substantially in inverse ratio with respect to said voltage thereby to vary the reactance in the input circuit and to maintain the output voltage constant, and means for adjusting the rate of operation of said current and voltage responsive means.

2. A constant voltage rectifier power supply system comprising in combination an input circuit and an output circuit, rectifier means interposed between said circuits, a reactor having three windings, the first of said windings being connected in the input circuit, means for passing direct current through the second one of said windings proportionally to the output current, and means responsive to the output voltage to pass direct current through the third one of said windings in inverse ratio to said voltage thereby to continuously adjust the effective reactance in the input circuit and to maintain the output voltage independent from variations in load and in input voltage, said latter means including means for adjusting the rate of operation thereof so as to aid in the maintenance of the output voltage independent of variations therein and of the load.

3. A constant voltage rectifier power supply system comprising in combination an A. C. input circuit and a D. C. output circuit, rectifier means interposed between said circuits, a reactor with three windings having one of its windings serially connected in said input circuit and another one of its windings serially connected in said output circuit, and means responsive to the D. C. output voltage to pass a portion of the output current through the third reactor winding substantially in inverse proportion with said voltage whereby the reactance in said input circuit will be continuously adjusted as a function of output current and voltage to maintain the output voltage constant, said means including rate of operation adjusting means therein for maintaining the output voltage independent of variations of the input voltage and of the load.

4. A constant voltage rectifier power supply system comprising in combination an A. C. input circuit including the primary winding of a transformer, a D. C. output circuit including the secondary winding of said transformer and a rectifier, a reactor with three windings having one of its windings serially connected in said input circuit and another one of its windings serially connected in said output circuit, a control resistance through which the third one of said reactor windings is connected across said output circuit, means responsive to the output voltage to continuously adjust said control resistance in accordance with an inverse function of said voltage whereby the reactance in said input circuit will be continuously adjusted as a function of the output current and voltage, and means for adjusting the rate of operation of said voltage-responsive means to maintain the output voltage independent from variations of the input voltage and of the load.

5. A constant voltage rectifier power supply system comprising in combination an A. C. input circuit and a D. C. output circuit including a load, rectifier means interposed between said circuits, a reactor having a pair of windings with one of said windings serially connected in said input circuit, a control resistance through which the other one of said windings is connected across said output circuit, and means responsive to the output voltage to continuously adjust said control resistance in accordance with an inverse function of said voltage whereby the reactance in said input circuit will be so continuously varied as to maintain the output voltage constant, said latter means including rate of operation adjusting means for aiding in the maintenance of said output voltage free from variations in said input circuit and said load.

6. A constant voltage rectifier power supply system comprising in combination a transformer, means for applying an A. C. voltage to the primary winding of said transformer, a rectifier including a load connected to the secondary winding of said transformer, a reactor having a pair of windings with one of said windings serially connected with said primary winding, a control resistance variable in increments through which the other of said reactor windings may be connected across the output of said rectifier, and means responsive to the rectified output voltage to adjust said control resistance in accordance with an inverse function of said voltage whereby the reactance in series with the primary winding of said transformer will be so continuously controlled as to maintain the output voltage constant, rate of operation adjusting means included in said latter means so as to maintain said output voltage free of variation in said A. C. voltage and said load.

7. A constant voltage rectifier power supply system comprising in combination an A. C. input circuit and a D. C. output circuit including a load, rectifier means interposed between said circuits, a reactor having a plurality of windings with one of said windings serially connected in said input circut, a control resistance, means responsive to the output voltage to continuously adjust said control resistance in accordance with an inverse function of said voltage, and a circuit including another second winding of said reactor, the control resistance variable in increments, and a direct current source for energizing said latter winding whereby the reactance in said input circuit will be so continuously varied as to maintain the output voltage constant and rate of operation adjusting means included in said means responsive to said output voltage so as to maintain the same independent of variations in the input circuit and said load.

8. A constant voltage rectifier power supply system comprising in combination an A. C. input circuit and a D. C. output circuit including a load, rectifier means interposed between said circuits, a reactor having a pair of windings with one of said windings serially connected in said input circuit, a voltage responsive regulator having an energizing coil connected across said output circuit and a resistance element variable in increments continuously controlled by said coil, and means for connecting the second winding of said reactor through said resistance element to the output circuit to continuously vary the reactance in said input circuit so as to maintain a substantially constant output voltage and rate of operation adjusting means included in said means responsive to said output voltage to maintain the same independent of variations in the input circuit and said load.

ROBERT O. WHITESELL.

REFERENCES CITED

The following references are of record in the file of this patent:

UNITED STATES PATENTS

| Number | Name | Date |
| --- | --- | --- |
| 1,650,072 | Jonas et al. | Nov. 22, 1927 |
| 1,965,439 | Stoller | Feb. 3, 1934 |
| 2,084,899 | Edwards | June 22, 1937 |
| 2,085,060 | Young | June 29, 1937 |
| 2,138,732 | Craig | Nov. 29, 1938 |
| 2,157,977 | Alriq | May 9, 1939 |
| 2,306,998 | Claesson | Dec. 29, 1942 |
| 2,322,130 | Hedding | June 15, 1943 |
| 2,331,131 | Moyer | Oct. 5, 1943 |
| 2,331,411 | Milarta | Oct. 12, 1943 |
| 2,346,997 | Priest | Apr. 18, 1944 |
| 2,450,012 | Master et al. | Sept. 28, 1948 |